(No Model.)
W. O. WORTH.
BICYCLE PEDAL.
No. 447,395.  Patented Mar. 3, 1891.
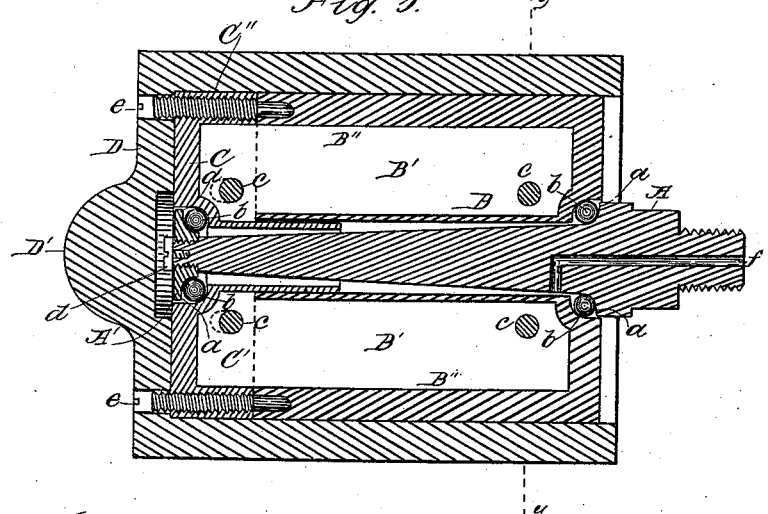
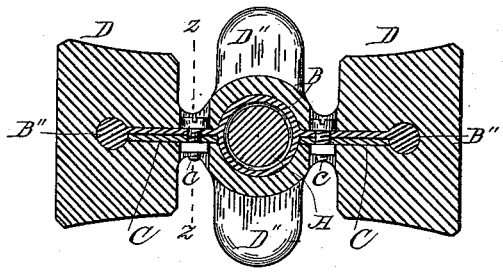
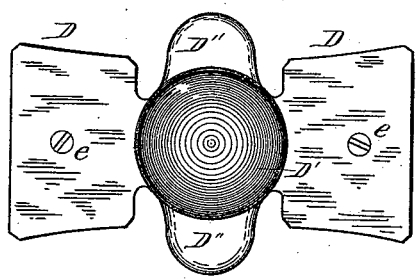
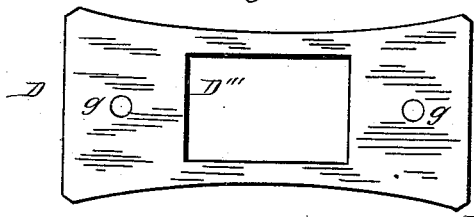
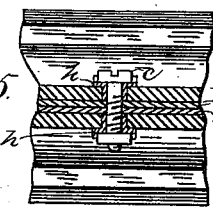
Attest
S. W. Brainerd.
C. A. Brainerd.
Inventor
William O. Worth,
By J. M. St. John,
Atty.

UNITED STATES PATENT OFFICE.

WILLIAM O. WORTH, OF CEDAR RAPIDS, IOWA, ASSIGNOR TO THE CHICAGO BICYCLE COMPANY, OF SAME PLACE.

BICYCLE-PEDAL.

SPECIFICATION forming part of Letters Patent No. 447,395, dated March 3, 1891.

Application filed November 25, 1889. Serial No. 331,471. (No model.)

*To all whom it may concern:*

Be it known that I, WILLIAM O. WORTH, a citizen of the United States, residing at Cedar Rapids, in the county of Linn and State of Iowa, have invented certain new and useful Improvements in Bicycle-Pedals; and I do hereby declare the following to be a full, clear, and exact description of the invention, such as will enable others skilled in the art to which it appertains to make and use the same.

The object of my invention is to improve the construction of pedals such as are used on bicycles by providing the rubber portion with a central connection adapted to prevent the rubber wings from turning, to so construct the rubbers as to exclude dust and cushion the pedal against accidents by falls, and to provide for a simple and efficient adjustment of the bearings of the pedal.

The invention consists in the construction, combination, and arrangement of parts to this end, as hereinafter fully set forth and claimed.

In the accompanying drawings, forming a part of this specification, Figure 1 is a central longitudinal section of the pedal in the plane of its widest diameter; Fig. 2, a transverse section of the same in the line $y\ y$ of Fig. 1, looking toward the left end of said figure. Fig. 3 is an elevation of said pedal as seen from the outer end. Fig. 4 is an end view of a modified form of rubber adapted to the ordinary form of pedal; and Fig. 5, a fragmentary sectional view of the pedal on the line $z\ z$, showing a modification in the attachment of the rubbers to the pedal-box.

Similar letters of reference indicate corresponding parts.

Referring to the drawings, A is the axle, which in its general form does not differ essentially from those in common use, having shoulders $a$ near one end and a collar A', with similar shoulders, at the other end, adapted to serve as bearings for the balls $b\ b$. Instead of having this collar adjustable, as is common, I screw it up to a shoulder, and set it in that position by a set-screw $d$. A further improvement in the axle consists in making the oil-hole $f$ in the center of the same and from the inner end, the better to exclude dirt and dust. On the axle is mounted a box B, having at the inner end (at the right) the usual counterbore to receive the balls. The two lateral wings B'' B'' are connected to the hub or box proper by thin webs B' B'. At the outer end of the axle is mounted a box C, of similar construction, its hub telescoping the hub of the box B and its flange or web C' overlapping the web B'. The webs are connected by bolts $c\ c$, and to allow for the proper longitudinal adjustment of the box the holes in the webs of one or both parts should be somewhat elongated. In the lateral wings of the outer box C'' C'' are screws $e\ e$, with their inner ends abutting on the opposite ends of the wings B'' B''. By screwing inwardly, the parts are necessarily thrust apart, and a proper adjustment of the box on the balls is secured thereby.

The improvement in the construction of the rubbers consists, essentially, in connecting the two lateral wings, which are commonly two separate pieces, by a central web or webs. In its simplest form the rubber may be as shown in Fig. 4, with hollow sides to receive the ball of the foot, a central hole to admit the axle, and lateral holes $g\ g$ for the lateral pins or bolts of a pedal as ordinarily constructed. This construction is such as to prevent the rubbers from turning and admits of the use of a softer and more elastic rubber than can be used where separate rubbers are held from turning by other means.

A further object I have in view is to protect the wearing parts of the pedal by completely incasing them with the elastic foot-pad, and this I accomplish by means of the construction shown in the other figures of the drawings. In the rubber, which is preferably made with the reduced central connection shown in Fig. 2, is a cavity corresponding to the outside of the box B C. Over these parts the rubber is slipped from the outer end and held in place by the bolts $c\ c$, which, in order to bind the rubber firmly in place, should be provided with socket-washers $h\ h$. This construction not only serves to exclude dust from the parts inside, but arrests the jar on the pedal and crank when the bicyle falls on its side, and limits the liability to bend the crank thereby. This cushioning action of the rubber may be further increased by forming a boss D' on the outer end.

To prevent the foot from slipping off the pedal sidewise, lugs D″ D″ may be formed on the rubbers at either or both ends.

What I claim is—

1. An elastic foot-pad for bicycles, incasing the frame of the pedal on the sides and outer end and having a central enlargement on the outer end, whereby the pedal is cushioned against sudden jars due to falling and the like, substantially as described.

2. The combination, with a bicycle-pedal, of an elastic foot-pad having a continuous connection across the outer end, whereby dust and dirt are excluded from the axle and bearings and the same is cushioned against bending strains by falling, as described.

3. The combination, with a bicycle-pedal, of an elastic casing inclosing the pedal-box on the sides and outer end, substantially as and for the purpose set forth.

4. An elastic foot-pad for bicycle-pedals, substantially as herein described, having lugs to retain the foot from lateral displacement, formed integral with the body of the foot-pad, as set forth.

5. In a bicycle-pedal, the combination, with an axle having shoulders thereon to serve as bearings for anti-friction balls, of a box composed of two parts, adjustable endwise, counterbored at their outer ends, respectively, balls interposed between said shoulders and counterbores, and one or more set-screws in one of the parts of the box, adapted to abut upon the other part of the box and distend the said box.

6. The herein-described box for bicycle-pedals, composed of the hub B, counterbored to form a seat for anti-friction balls and having flanges B′ B′ and wings B″ B″, the extension-nut C, similarly counterbored and having flanges C′ C′ and wings C″ C″, connecting-bolts c c, and adjusting-screws e e, substantially as and for the purpose set forth.

7. In a pedal, substantially as described, the combination of the extension-box, an inclosing casing of elastic material, as rubber, bolts adapted to connect the two parts of the box, and washers under the heads and nuts of said bolts, having a bearing on the box-plate and another bearing on the rubber, whereby all the parts are held in connection, substantially as described.

8. The combination, in a bicycle-pedal, of an axle having an oil-hole leading to the bearings from the inner end of said axle, and a box inclosed by an elastic foot-pad, whereby dust and dirt are excluded from the bearings, as described.

In testimony whereof I affix my signature in presence of two witnesses.

WILLIAM O. WORTH.

Witnesses:
   H. B. HAWLEY,
   S. W. BRAINERD.